Feb. 23, 1932.　　　E. O. BENJAMIN　　　1,846,833
APPARATUS FOR GENERATING GAS FROM LIQUID HYDROCARBONS
Filed March 24, 1928　　6 Sheets-Sheet 1

INVENTOR
Edward O. Benjamin.
BY
ATTORNEY

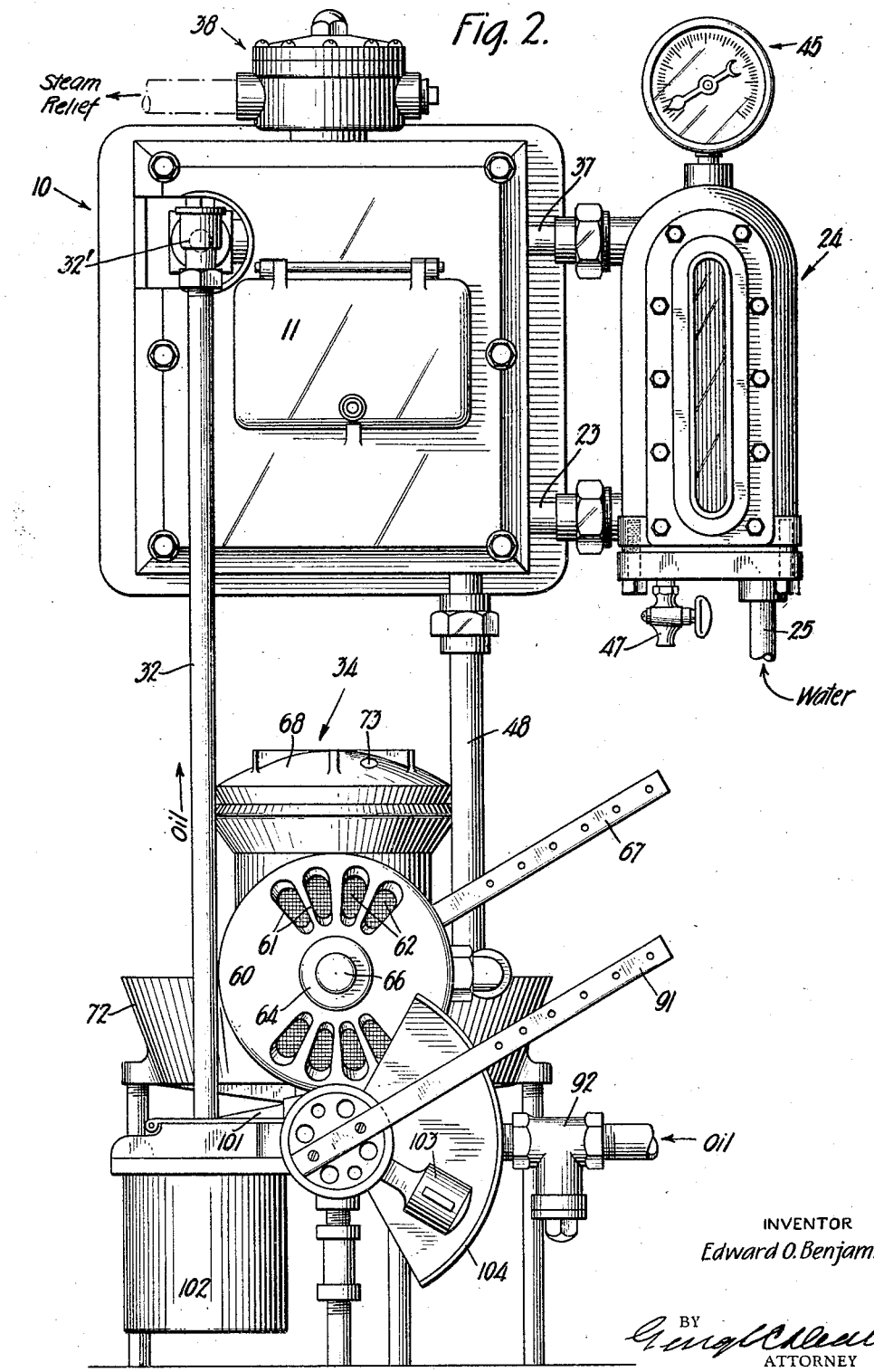

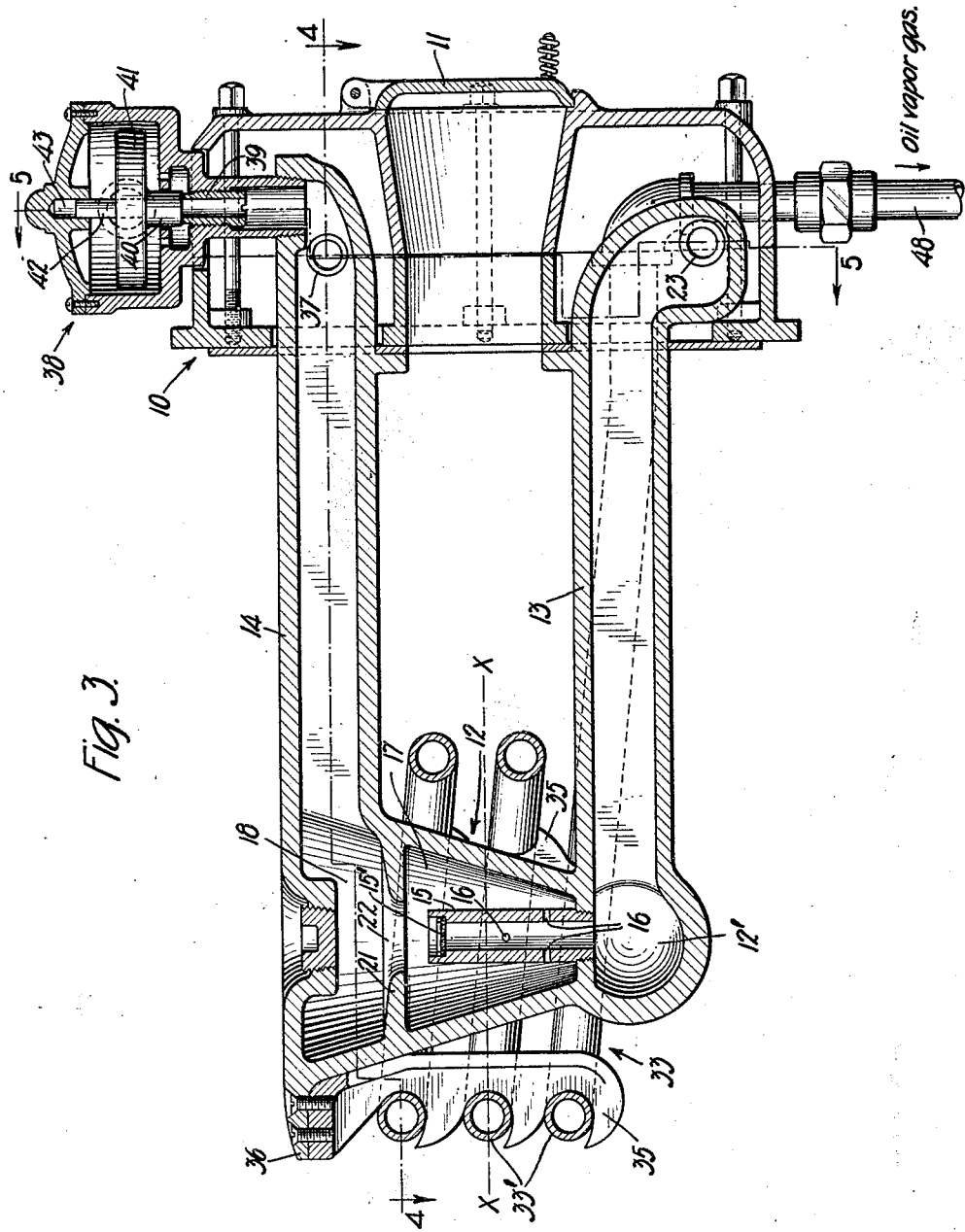

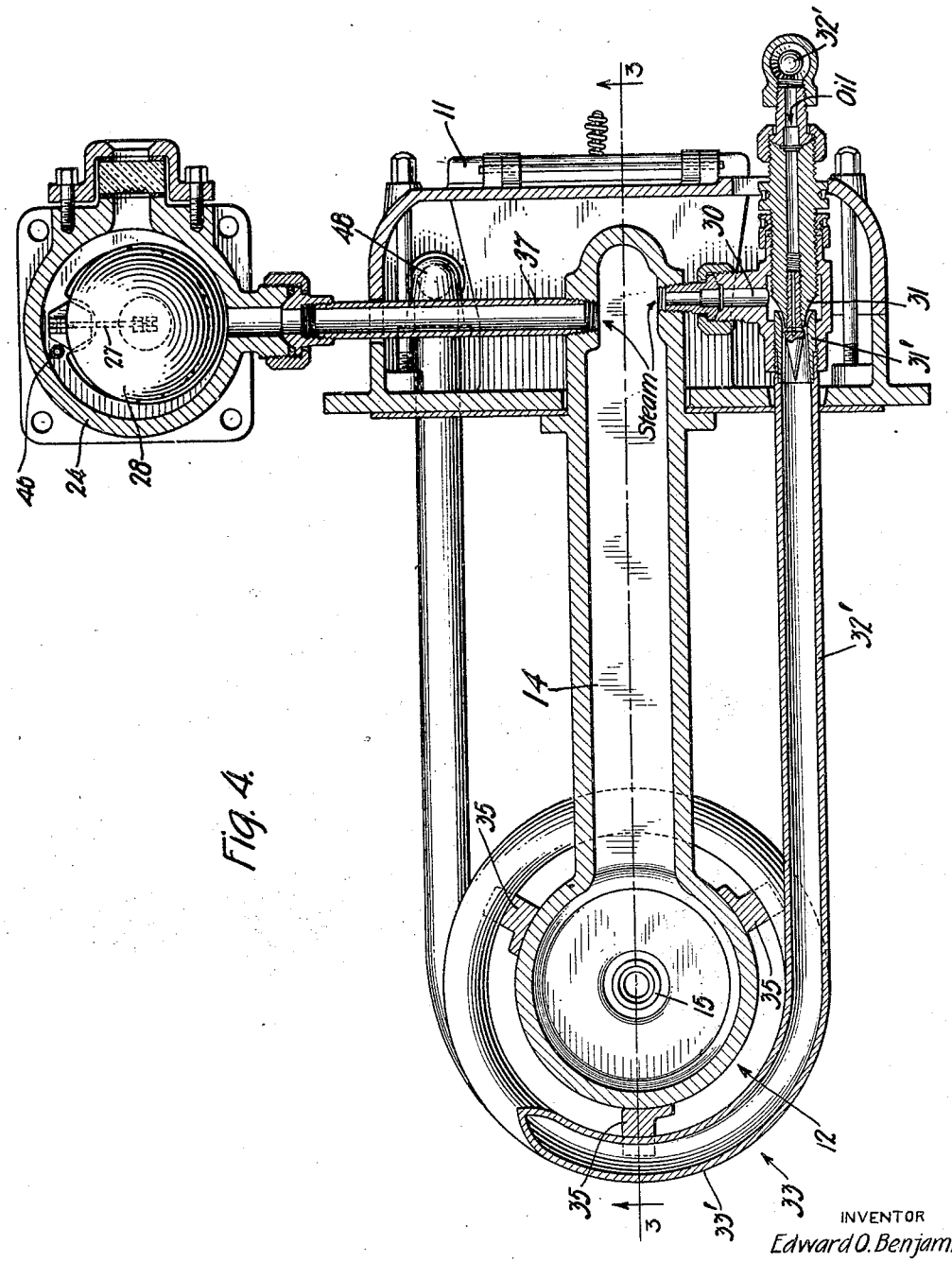

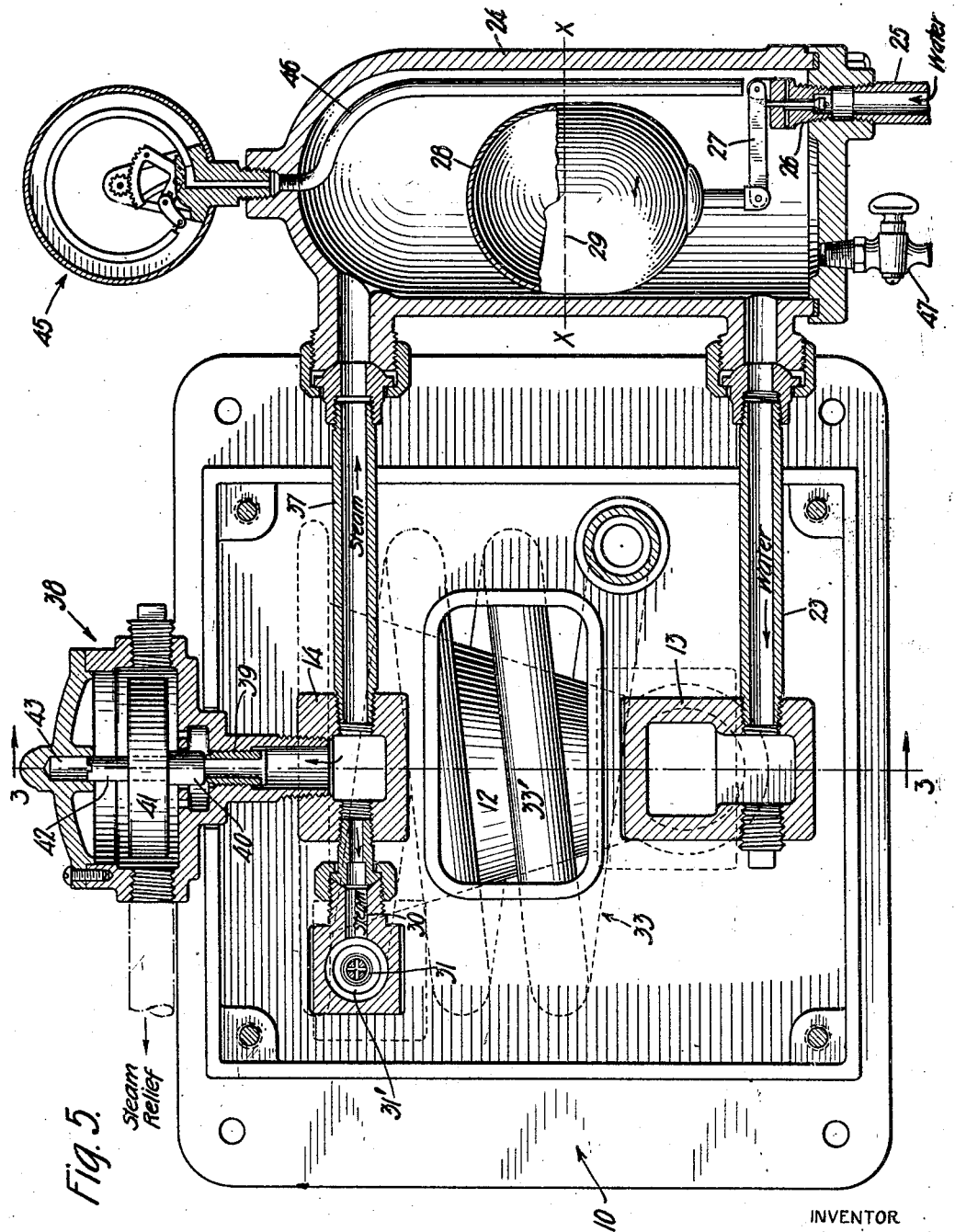

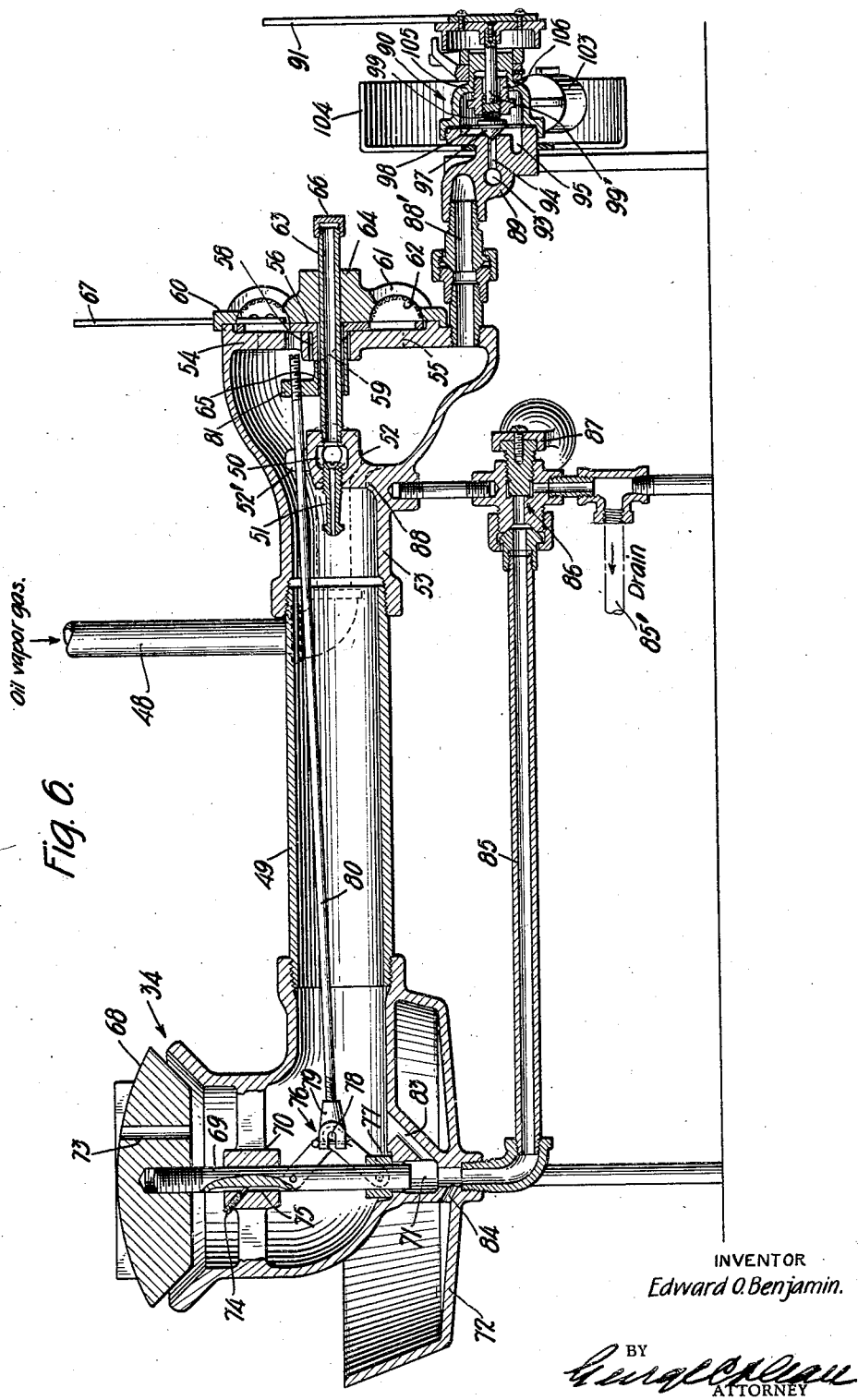

Patented Feb. 23, 1932

1,846,833

UNITED STATES PATENT OFFICE

EDWARD O. BENJAMIN, OF NEWARK, NEW JERSEY

APPARATUS FOR GENERATING GAS FROM LIQUID HYDROCARBONS

Application filed March 24, 1928. Serial No. 264,411.

My present invention is shown as embodied in a complete apparatus adapted for use in the fire boxes of boilers or ordinary furnaces such as are used for heating houses, but it will be obvious that certain of the novel features will be found useful in other relations. Some of the basic principles involved are quite similar to those disclosed and claimed in my co-pending application Ser. No. 705,813, filed April 11, 1924, patent granted June 12, 1928, No. 1,672,997. In both cases, the invention is a gas producer and a suitable source of heat for operating it. While any suitable source of heat may be employed, the invention, as shown, includes a burner in which fuel oil or other liquid hydrocarbon is burned to produce initial heat, but this heat is utilized to produce a water gas reaction between fluid hydrocarbon and steam, forming a carbon monoxide (CO) and hydrogen (H). In normal full operation, however, gas thus produced is preferably the fuel that is employed to keep up the water gas reaction and it is burned under conditions insuring practically complete combustion. As part or all of the gas may be tapped off or all of it may be burned in the burner, the device is obviously adaptable for use in almost any place where generation of heat or of fuel gas is desired.

The object of the invention is to produce complete apparatus of novel construction, especially suited to the above purposes; which may be made of almost any size or capacity; which will stand up under extreme conditions of use or abuse; which will operate efficiently for the production of a completely gasified mixture; which will be automatically self regulating within very wide limits and which will be practically fool proof in the hands of unskilled users.

The complete combination includes means for generating steam, for preventing water from being carried along with the steam, for superheating the steam, for utilizing the steam pressure to atomize and inject fluid hydrocarbon into a reaction chamber which is maintained at high temperature and wherein the reaction between the hydrocarbon and the steam is effectively promoted, and for burning the gas to produce such steam and to maintain such temperature. The reaction chamber is a passage long enough and having sufficient flow resistance to afford time for a complete development of the water gas reaction, but is self draining so as to avoid trapping or accumulation of liquids.

In normal operation, the gasified mixture flows from the reaction chamber through a constricted nozzle under pressure sufficient to produce a powerful injector jet, which discharges into a mixing tube having suitable air draft inlets supplying a substantial amount of primary air to the mixture but not in sufficient quantity to support combustion. The partly aerated gas from the mixing tube flows to a burner beneath the steam generating boiler in heating relation to both said boiler and said reaction chamber, the latter being a coil, preferably in the form of a helix, co-axial with and surrounding a considerable portion of the boiler.

During the preliminary stage prior to normal operation, the hydrocarbon fuel flows through the reaction chamber and the injector jet into a flash pan beneath the boiler. When a sufficient amount of oil accumulates in the flash pan, the oil may be ignited so that the flame will heat up the reaction chamber, steam generator, superheater and other operative elements of the device until steam is generated in sufficient quantity and at pressures necessary to atomize the oil, whereupon the normal water gas reaction begins.

In normal operation the automatic regulation of the device is due partly to the proportioning of the parts and partly to means for regulating the water supplied to a feed water chamber in accordance with the height of water in the chamber, to means for connecting the upper end of the boiler with the feed water chamber above the level of the water and thereby equalizing the pressure at the upper and lower ends of the boiler, and to an arrangement to cause relief of the pressure in the steam line from the boiler when a predetermined pressure is exceeded.

The primary feature of the regulation referred to results from the fact that with any given rate of oil supply, too great a supply of steam will result in decomposing unnecessarily large amounts of water, producing non-combustible carbon dioxide instead of the desired carbon monoxide. Carbon dioxide so produced operates in two ways: first, it represents a loss of most important fuel constituents; and, second, it tends to retard combustion. Moreover, excessive steam is itself a diluent tending to retard combustion. Consequently, generation of steam in excess of what is required for the rate of fuel supply operates immediately to decrease the heat available for generating the steam. On the other hand, the critical temperature and most efficient operation having once been passed, decrease of steam will operate to increase the percentage of combustible carbon monoxide and decrease the steam diluent and cause the steam to act as an oxygen carrier to intensify combustion, thereby increasing the heat of the flame.

In conjunction with such natural self regulation, due to proportioning of parts an important feature of my present invention is the employment of pressure-equalizing means which in a preferred form includes a feed water chamber having a float-controlled valve for regulating the water supplied thereto and connected near its upper end with the boiler and at its lower end with the lower end of the boiler to equalize the pressure at the upper and lower ends of the boiler. Another feature is that of providing a safety valve to prevent excessive steam pressure. Other features of the invention consist in the arrangement for heating the water from the feed water chamber as it passes to the boiler proper and providing a flash boiler section into which feed water or water and steam are sprayed and in which the feed water not already vaporized is converted substantially instantaneously into steam which is superheated and then led to an atomizing injector for the liquid fuel. Another important feature of the invention relates to means for preventing water and froth from being carried through the flash section to the upper part of the boiler. Further important features of the invention relate to means for controlling the supply of oil to the atomizing injector, to the formation of the burner and the means for regulating at the burner outlet the flow section of gas and air passing therefrom, and of means for varying both the air supplied to the mixing tube and the flow section of air and gas passing from the burner.

The above and other features of my invention may be more fully understood from the following description in connection with the accompanying drawings, in which Fig. 1 is a view in side elevation illustrating one form of my improved apparatus;

Fig. 2 is a front view;

Fig. 3 is a vertical sectional view through the upper part of the apparatus, taken on the line 3—3 of Fig. 4;

Fig. 4 is a section on the staggered line 4—4 of Fig. 3;

Fig. 5 is a section along the staggered line 5—5 of Fig. 3; and

Fig. 6 is a longitudinal section of the lower part of the apparatus.

Figure 1:
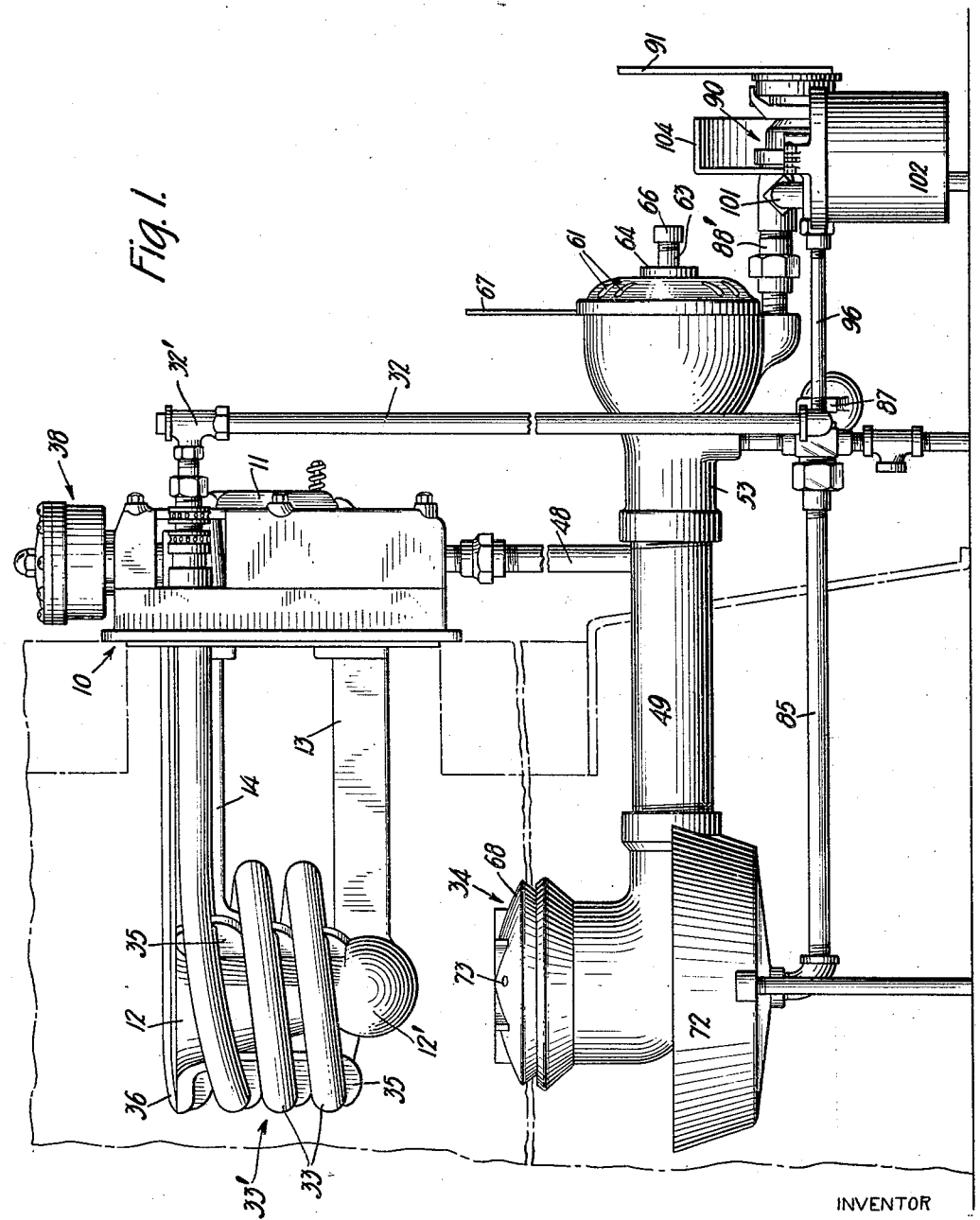

My improved apparatus is very compactly arranged and includes an upper portion in which the steam and gas are generated and a lower portion or burner for heating said upper portion to produce the steam and to heat the mixture of steam and atomized liquid fuel in the upper portion to the temperature required to produce the water gas. Preferably the steam and gas generating device is specifically designed for insertion through the door of a furnace provided with the usual stack or chimney draft. It is supported from a frame 10 secured in said opening and the lower portion or burner is adapted for insertion through an opening in the lower part of the furnace such, for example, as that provided by the frame of a door ordinarily used for the removal of ashes. Thus arranged, any small amounts of the carbon monoxide, as can possibly escape unburned will be safely drawn off, up the chimney.

The frame 10 has a central opening communicating with the interior of the furnace and a door 11 at the front of said opening, and serves to support a steam generator or boiler 12 by means of hollow supporting members or tubes 13 and 14 extending respectively from the lower and upper ends of the boiler and entering said frame 10. The lower member 13 serves to supply water to the lower end of boiler 12 and may be considered as part of a preheating section thereof and the upper member 14 conducts the steam from the upper end of the boiler to the frame 10 and may be considered as part of a superheating section of the boiler. The boiler 12 has at its lower end a small generally spherical chamber 12′ into which the water passes directly from the tube 13 and from which the fluid as liquid, or as gaseous, or more usually as a gas and spray mixture passes upwardly into a device 15 for screening and throttling upward movement of water or froth and preferably comprising a tube having its upper end a screen 15′ and also having laterally directed openings 16 through which the water or steam passes into a steam chamber 17 in the form of an inverted frustrum of a cone. Initially, the water will flow through the openings 16, establishing water level at about line $x-x$, Fig. 3, within tube 15 and also in surrounding chamber 17. During full normal operation, however, water in 17 boils down until a foaming steam spray is projected through the openings 16. The water particles of this mixture are turned to steam immediately upon striking the then highly heated wall of the outer chamber 17. In this connection it should be noted that the stream of water flowing through the tube 13 is of considerable cross-section and that although it is heated and may be caused to boil and froth in passing therethrough, the vaporizing of all the water to steam will not ordinarily be completed until it is subjected to the higher heat of the intermediate chamber 17. This chamber or portion 17 is separated from an upper or drying chamber 18, which serves the purpose of a superheating steam dome, by a dividing wall 21 having a restricted opening 22 through which the steam passes upward. The screen 15' may be one or more layers of very fine mesh so as to permit, but affording considerable resistance to high velocity flow thereof. Moreover, it substantially prevents through flow of froth or bubbles by reason of the water-film resistance in the fine mesh. The pressure in the tube 15 may be considerable when the apparatus is in full operation, and the screen must therefore be strong, such strength being attained, for example, by use of several layers of screen material. The arm or tube 13 really forms part of the preheating portion of the boiler. The end thereof attached to the frame 10, is connected by means of a duct or pipe 23 to the lower end of the feed water chamber or tank 24. Water is preferably supplied to the tank 24 by means of a pipe 25 connected with the lower end thereof and having a valve 26 controlled by a pivoted lever 27 and a float 28 so that when the level of the water in the tank 24 falls below a predetermined level $x-x$ indicated on Fig. 5, the valve will be opened and water admitted to the feed water tank. The tank or chamber 24 may be provided with a vertically arranged glass plate in its front so as to permit inspection when desired.

The upper member or tube 14 is connected through a duct or passage 30 with an oil injector 31 to which the oil is supplied through a pipe 32. The oil is supplied under pressure and the superheated steam coming in around it in a Venturi tube 31', has an injector effect thereon forcing the steam and atomized oil or vapor mixture into a pipe 32' which extends to the boiler portion 12 where it is formed as a coil positioned coaxially around the boiler. This coil 33' serves as a gas making retort 33, the heat necessary for operating it being supplied by suitable means such as a burner 34. The retort 33, may be supported from the boiler by means of suitable brackets 35 attached in any suitable manner to a flange 36 at the upper end of the boiler. The functions of this flange include that of further deflecting the hot draft and flame from the burner which has already been deflected outwardly by the boiler, and of conducting heat thus absorbed to highly heat the upper or superheated part of the boiler, including the tube 14.

The passage in the member or tube 14 also communicates through means including a duct or pipe 37 with the upper end of the feed water tank 24 for the purpose of compensating for the back pressure through the pipe or duct 13 and of equalizing the pressure at opposite ends of the boiler. The member or tube 14 also communicates at its forward end with a safety valve 38 which opens when the pressure becomes too great, thereby avoiding dangerous conditions. The safety valve 38 is of ingenious simplicity, so designed that all danger of sticking or other irregularity of operation is precluded. It comprises a valve member 39 in the form of a tube having its upper edge beveled at an angle, preferably of about 30 degrees, to serve as a valve seat on which rests ordinarily a valve member 40 projecting from the lower side of a cylindrical weighted member 41 having at its upper side a rod or pin 42 fitting in a cylindrical opening 43 which serves as a guide therefor. When the safety valve opens, the steam passes out into the atmosphere until the pressure is sufficiently reduced. Preferably, one of the valve members 39 and 40 is of phosphor bronze and the other is of Monel metal. The feed water tank 24 is provided at its upper end with a pressure indicator 45 of the Bourdon type communicating with a pipe 46 which extends substantially to the bottom of the tank. The tank may be drained through a cock or valve 47 at the bottom thereof.

The tube or pipe forming the retort 33 extends from the lower end of the coil portion thereof to the frame 10 where it is connected through the lower part of the frame with a pipe 48 which extends downwardly to a substantially horizontal mixing pipe or chamber 49 and communicates with a chamber 50 opening into a nozzle 51 from which gas is forced axially of the mixing tube 49 toward the burner 34. The nozzle 51 is supported in a bracket 52 which contains the chamber 50 and projects inwardly from the wall of a member 53 secured at one end to the mixing pipe 49 and increasing in cross section to its other end where it has an end wall 54 having therein openings 55 to admit air to be mixed with the gas flowing from the nozzle. Just outside of the wall 54 is a rotatable damper 56 having openings 57 to co-operate with the openings 55 and having at its inner face a sleeve 58 projecting into a central opening in the wall 54 and having a cam edge 59 adapted to act in a manner to be described hereinafter.

Just outside of and substantially surrounding the damper 56 is a guard member 60 having openings or windows 61 closed by screens 62 to prevent the admission of dust and other foreign matter. A member 63 in the form of a pipe extends through the hub 64 of the member 60, the sleeve 58, and a cam sleeve 65 adapted to co-operate with cam edge 59 and the sleeve 58 for a purpose to be described hereinafter, and is screwed into the bracket 52 adjacent the chamber 50. The member or pipe 63 is here shown as closed at its outer end by a cap 66 threaded thereon. The damper 56 may be shifted to different positions, as desired, by means of an arm 67 projecting radially through a suitable opening which may be, for example, in the rim of the guard member 60.

The burner 34 is a novel type of the Bunsen burner. It has a flared upper end or tip adapted to cooperate with a closing or valve member 68 tapered at its outer edge to co-operate with said tip to provide an annular outlet opening for the mixture of gas and air to be burned. For adjustment of the flow section of the outlet, the valve member or deflector 68 may be adjustably mounted, as by screw threads on the upper end of a vertically shiftable member or rod 69 slidable in a guide at the center of a spider 70 in the burner near the outlet and in the reduced upper end of a duct or passage 71 extending through the bottom of the burner and of the flash pan 72. The valve member 68 may have a generally spherical upper surface divided by ribs extending from its highest point and may have perforations 73 extending through it in the regions between the ribs. The hot blast from the annular outlet tends to pass up between the coil and the conical boiler section and the perforations 73 permit escape and endure burning of gas generated after valve 68 is closed. The rod 69 may be held against turning by any suitable means such as a screw 74 passing through the hub of the spider and projecting into a longitudinal groove 75 in the rod.

The vertical movement of the rod 69 may be effected by means of a toggle 76 having an upper arm with its upper end pivoted to the rod and a lower arm pivoted at its lower end to a block 77 resting on the bottom of the burner and pivoted at its upper end to the lower end of the upper arm by a pin 78 normally positioned in a slot or opening in the end of a forked head 79 on a rod 80 threaded at its other end in a lug 81 projecting from the cam sleeve 65. It will be seen that upon swinging the arm 67 downwardly to the position in Fig. 6 to close the damper the toggle 76 will be collapsed and the valve member 68 will be in its lower position and that upon movement of the arm in the opposite direction the sleeve 58 will act on the sleeve 65 to force the rod 80 to the left (Fig. 6), thereby actuating the toggle to raise the valve member 68 and permit increased flow of the combustible mixture without increase of its velocity. The sleeve 65 may be held against rotation in any suitable manner as by means including a lug 52' projecting upwardly from the bracket 52.

The mixing tube 49 is connected with the duct 71 through a duct 83 and the flash pan is connected with the duct 71 through a duct 84 at a point below the lower end of the duct 83. The lower end of the duct 71 communicates with a pipe 85 leading to a valve 86 at the front of the furnace where it is accessible. This valve 86 is normally held closed by means of a weighted arm 87 which may be swung upwardly to unscrew and open the valve to permit the oil to flow out through the drain pipe 85' and may be retained in such position as long as required to complete the draining operation.

The bracket 52 extends across the lower side of the opening in the member 53 so as to serve the purpose of a dam and is provided at a point somewhat above the level of the lowest portion of the mixing pipe or chamber with a drain 88 through which oil, when too much has accumulated in the mixing chamber or tube, will pass into the larger end of said member 53 and flow into a part thereof located below the level of the lower edge of the guard member 60. Oil collecting at this point flows through a suitable conduit or duct 88' to a device 89 which includes a valve 90 adapted to control the flow of oil to the oil supply pipe 32 and may be controlled by means of a handle or lever 91.

As indicated most clearly in Figs. 2 and 6, the oil is supplied through an oil filter 92 to a duct 93 in said device 89 and this duct 93 is connected by a horizontal duct 94 to a chamber 95 from which the oil may pass to the tube 32 through a pipe 96 (Fig. 1). The duct 94 may be closed at one end by a conical valve member 97 carried by a diaphragm 98 and having a left-hand thread engagement in sleeve 106 and the latter having a right hand screw mounting in casing 105. The exterior of the sleeve has a right-hand thread and it is rigid with weight 103 so that when released, the sleeve screws shut the valve by the action of both the left and right-hand threads. The stem of valve 97 is connected with a rod 99' which is connected with the handle or arm 91 so that when said arm is lifted, the valve is closed.

The conduit or duct 88' is connected with a pipe 101 which drains into a bucket 102 controlling a well known kind of trip device such as may be required by the fire underwriters whereby, when the bucket is filled to a predetermined extent, it operates a float (not shown) releasing a detent on sleeve 106 permitting the weight 103 (Fig. 2) to swing downwardly along a quadrant guard 104, thereby rotating the sleeve 106 and closing valve 97, as above described.

The handles or arms 67 and 91 may be controlled manually or may be operated automatically. For example, both of these arms may be connected with a suitable pressure indicating device of a steam boiler heated by the apparatus of the present invention, in such a manner that increase of pressure in the boiler will swing the arms counter-clockwise and tend to cut down the flow of gas at the burner and also the flow of oil to the gas producer. When the oil has been shut off by the trip device, it is necessary before again starting the apparatus to empty the bucket and lift the weight 103 and the arm by which it is carried to a position such as to restore it to the control of the trip device.

The operation is substantially as follows: When the valve 90 is opened, oil flows through the filter 92 and the valve 90 to the pipe 32 from which it passes through check valve 32' and the injector 31 into the retort 33. From the bottom of the retort the oil flows through the pipe 48 to the chamber 50 in the bracket 52 and passes therefrom through the nozzle 51 axially of the mixing pipe or chamber 49 toward the burner end thereof. Due to the dam formed by the bracket 52 at the end of the mixing chamber farthest from the burner, the oil flowing into the mixing chamber passes to the burner end thereof and down through the duct 71 so that when the pipe 85 is full the oil will flow through the duct 84 into the flash pan 72 where it may collect to the level of the lower edge of the inlet of drain 88. Any additional oil will then flow through the drain 88 and pass to the trip device. Ordinarily the oil in the flash pan is ignited before such a quantity of oil has accumulated.

At this stage in the starting of the apparatus the water in the feed water tank or chamber 24 is at the level indicated by the dotted line x—x, and the water is maintained at the same level in the intermediate chamber 17 of the boiler, into which chamber the water passes from the pipe 15 through the openings 16, as above described. After ignition of the oil in the flash pan and sufficient heating of the parts including the boiler by the flame from the flash pan, the water in the boiler 12 will evaporate and form steam which will pass upwardly through the restricted opening 22 into the drying chamber, then through the hollow member 14 to the front part of the furnace and from there through the passage or duct 30 to the Venturi tube 31' of the oil injector.

The steam will then draw forward the oil fed to the injector and a mixture consisting of hot steam and vaporized hydrocarbon or finely atomized oil in suspension therein will pass into the end of the pipe constituting the retort 33. As long as the oil flows into the mixing chamber 49 oil will be maintained in the flash pan at a level not exceeding the level at the lower side of the drain 88. But when the flow ceases or is cut down to a sufficient extent, the oil in the flash pan will burn out and combustion at that point will cease. If for any reason, such as failure to start the gas producing operation soon enough, too much oil collects in the mixing pipe or chamber 49, the oil will flow through the drain 88 and duct 88' to the trip device which upon sufficient accumulation of the oil will act to shut off the oil.

The reaction occurring in the retort, the mixing of the products of reaction with air, and the delivery to the burner have been described above. As the temperature rises the water gas reaction becomes complete and the burner having been ignited, the temperature of the flame therein increases and more air is induced through the open chamber until equilibrium is reached for a given rate of fuel supply. When the apparatus is in full normal operation, the oil is completely vaporized and the retort operates at full efficiency, and, the air burns with a steady and intense blue flame. As already stated, the supply of air to the burner and the opening of the burner may be varied by shifting the arm either manually or automatically and the supply of oil may be regulated by means of the arm 91.

In general, the steam generator or boiler section of the apparatus may be considered as made up of a lower or preheating section including the lower arm or duct 13 and the chamber 12', an intermediate or flash boiler portion including the chamber 17, and an upper or superheating section including the chamber 18 and the upper arm or duct 14. In normal operation, the water in the arm or duct 13 and the chamber 12' is boiling or bubbling, but there is no portion of this section serving the purpose of a steam dome. The boiling water and the steam pass up into the tubular device 15 and subject the same to heavy internal pressure. The steam rising to the upper end of the device 15 passes through the screen 13' which, however, prevents the direct upward movement of water to the drying or superheating section. The water and also steam and froth are, however, forced or sprayed out of the lateral openings 16 and are vaporized upon coming into contact with the red hot wall of the conical intermediate section or chamber 17 which serves as a flash boiler. From the chamber 17 the relatively dry steam passes upwardly through the restricted opening 22 in the wall 21 into the upper or superheater section including the chamber 18 and the arm or duct 14.

While the size of my device is not an essential feature and while the relative sizes of parts may be varied within limits, it is an important feature that I have succeeded in embodying in a compact arrangement, elements whereby a true and relatively perfect water gas reaction may be brought about. It is an essential of such reaction not merely that the atomized oil be broken down to combustible gas and free carbon, but also there should be the characteristic water reaction with the free carbon or soot, to form combustible carbon monoxide (CO). My construction of proportional parts is particularly adapted to make certain the proper functioning of the device in this particular. As brought out in said co-pending application, one factor in producing the desired result consists in having the retort tube of great diameter as compared with the capacity of the steam and oil supply device, so that although the steam and oil may enter the coil at a very high velocity and temperature, the cross section of the tube in which they merge will be so large in proportion that the gases will actually travel through the coil quite slowly and be exposed to the heat thereof for the relatively long time necessary to produce the above described result.

Many of the structural details described in the specifications are not essential to the success of the invention. For instance, so far as concerns the broader aspects of the invention, the shape of the retort might be varied, other means might be utilized for controlling the flow of water and oil, or for controlling the action of the burner, without departing from the spirit of the invention which may include any and all changes and alterations that fairly fall within the scope of the appended claims.

The injector 31 is claimed herein only in combination with the retort and as concerns its function of injecting the fluid hydrocarbon within a surrounding sheath of steam so as to prevent immediate contact of the hydrocarbon with the hot walls of the tubular retort and with only the longitudinal adjustments shown for varying the positions and flow section of the injector streams, but it will be understood that in practice the details of construction are preferably the same as those shown and separately claimed in my companion application Ser. No. 274,745, filed May 3rd, 1928.

I claim:

1. A gas producer and burner apparatus in combination with a furnace, including a burner located centrally of the furnace, a gas producer device positioned above said burner, a mixing pipe extending from the outside of the furnace to the burner, a gas injector nozzle in said mixing tube and connected with said gas producer, a drain from the inner end of said mixing tube and a device at the other end of the mixing tube having an overflow outlet raised above the bottom of said mixing tube, a flash pan beneath the burner tip, a drain duct connecting the flash pan with the drain for the mixing tube, whereby oil entering the mixing tube will be caused to flow to the burner tip end and then through the connecting ducts to the flash pan, means for draining said ducts when desired and means to conduct oil overflowing at the other end into an overflow-controlled device adapted to shut off the apparatus when too great an amount of oil is permitted to run therefrom.

2. A gas producer and burner apparatus in combination with a furnace, including a burner located centrally of the furnace, a gas producer device positioned above said burner, a mixing pipe extending from the outside of the furnace to the burner, a nozzle in said mixing tube and connected with said gas producer, a drain from the inner end of said mixing tube, a flash pan beneath the burner tip, a drain duct connecting the flash pan with the drain for the mixing tube, whereby oil entering the mixing tube will be caused to flow to the burner tip end and then through the connecting ducts to the flash pan, means for draining said ducts when desired and overflow means at the outer end of said mixing tube to limit the height of oil accumulating in the flash pan and including an overflow trip device to shut off the apparatus when too great an amount of oil is permitted to run therefrom.

3. A gas producer and burner apparatus adapted for use in the fire box of a furnace, a retort in the form of a vertical coil into the upper end of which oil and steam are injected, a steam boiler in the form of an inverted cone furnishing steam to effect such injector of oil and steam and comprising a relatively small water chamber at its lower end, a larger steam generating chamber above the water chamber and a drying chamber separated from the steam generating chamber by a wall having a restricted opening, a water duct of relatively large flow section extending from the side of the fire box to the water chamber, a standpipe projecting from the upper side of the water chamber into the steam generating chamber and having water delivery means including a side opening, means tending to maintain the level of the water in the pipe above said opening so that when the apparatus is not working the water will fill the lower part of the steam generating or vaporizing chamber, but in full normal operation the water will be vaporized as fast as supplied.

4. A gas producer and burner apparatus adapted for use in the fire box of a furnace, a retort in the form of a vertical coil into the upper end of which oil and steam are injected, a steam boiler in the form of an inverted cone furnishing steam to effect such injection of oil and steam and comprising a relatively small water chamber at its lower end, a larger steam generating chamber above the water chamber and a drying chamber separated from the steam generating chamber by a wall having a restricted opening, a duct extending from the side of the fire box to the water chamber and of sufficient flow section to prevent substantial steam generation therein, a standpipe projecting from the upper side of the water chamber into the steam generating chamber and having water delivery means including a side opening, means tending to maintain the level of the water in the pipe above said opening so that when the apparatus is not working the water will fill the lower part of the steam generating or vaporizing chamber, but in full normal operation the water will be vaporized as fast as supplied.

5. A gas producer and burner apparatus adapted for use in the fire box of a furnace, a retort in the form of a vertical coil into the upper end of which oil and steam are injected, a steam boiler in the form of an inverted cone furnishing steam to effect such injection of oil and steam and comprising a relatively small water chamber at its lower end, a larger steam generating chamber above the water chamber and a drying chamber separated from the steam generating chamber by a wall having a restricted opening, a duct of considerable flow section extending from the side of the fire box to the water chamber and serving with said water chamber as a preheating section, means separating the water chamber from the steam generating chamber and adapted to admit water at rates causing it to collect in said steam generating chamber when the apparatus is not in full operation while restricting the flow so that during full normal operation water will be vaporized as fast as admitted to the steam generating chamber.

6. In a burner, a generally horizontal duct having air inlet means at one end, an upwardly turned burner tip at the other end of said duct, a fuel gas injector nozzle arranged substantially axially of said duct and adapted to draw in air through said inlet means and urge the mixture toward said burner tip, means for opening and closing said inlet means, a valve or closure member positioned above the burner tip, a toggle for raising and lowering said valve member to vary the flow section of the annular outlet passage formed between the same and the tip and means for operating said opening and closing means for the inlet and at the same time operating said toggle to increase or decrease the flow section of the annular outlet in accordance with the increase or decrease of the air supplied to said mixing duct.

7. In a burner, a substantially horizontal mixing pipe, a gas nozzle arranged axially of the mixing pipe, air inlet means at the rear of said nozzle, a damper rotatable about the axis of said pipe for opening and closing said inlet means, an upturned circular burner tip at the other end of said pipe, a closure member positioned centrally above said outlet to provide an annular passage and adapted to open and close the same, and means for actuating said closure member vertically in accordance with the opening and closing of said inlet means, such actuating means including a cam connected with said rotatable damper at the center thereof.

8. In a burner, a horizontal mixing pipe, a gas nozzle arranged axially of the mixing pipe, air inlet means at the rear of said nozzle, a damper rotatable about the axis of said pipe for opening and closing said inlet means an upturned circular burner tip, a closure member above said outlet and adapted to cooperate therewith, means for actuating said closure member vertically in accordance with the opening and closing of said inlet means, such actuating means including a cam connected with the center of said rotatable damper, and a toggle device adapted to actuate the closure member and to be actuated by the cam on the damper.

9. In a burner, a substantially horizontal mixing pipe, a gas nozzle arranged axially of the mixing pipe, air inlet means at the rear of said nozzle, a damper rotatable about the axis of said pipe for opening and closing said inlet means, a cam mounted on the side of the damper towards the nozzle, a closure member above said outlet and cooperating therewith to form an annular outlet passage, a toggle device for raising and lowering said closure member, and means for actuating said toggle including a rod connected thereto and a follower connected with said rod and adapted to be actuated by said cam.

10. In a gas producer and burner apparatus, a steam generator including a small preheater water chamber, a flash boiler section in the shape of an inverted cone communicating at its small end with the preheater water chamber, a superheater chamber above the flash boiler section and separated therefrom by a wall having a restricted orifice above the opening at the small end of the cone, and a controlling device secured in the opening at the small end of the flash boiler comprising a tube projecting upwardly from said small end and having lateral orifices and a screen with fine openings therethrough extending across the top of said tube to prevent the direct upward passage of water while permitting the passage of steam, the flow through the lateral orifices in the tube being restricted so that when the apparatus is in full normal operation water forced through the tube against the conical wall of the flash boiler will be vaporized substantially instantaneously; and means for heating said steam generator including a burner having an annular outlet passage so as to provide an upward blast to engage the conical outer wall of the flash boiler section and having outlets within the boundary of said annular outlet to assure heating of the small water chamber at the lower end of the steam generator.

Signed at New York, in the county of New York and State of New York, this 22nd day of March, A. D. 1928.

EDWARD O. BENJAMIN.